(12) United States Patent
Chen et al.

(10) Patent No.: US 10,214,048 B2
(45) Date of Patent: Feb. 26, 2019

(54) BICYCLE WHEEL

(71) Applicant: GIANT MANUFACTURING CO., LTD., Taichung (TW)

(72) Inventors: I-Teh Chen, Taichung (TW); Che-Wei Hsu, New Taipei (TW); Hui-Yuan Su, Kaohsiung (TW)

(73) Assignee: GIANT MANUFACTURING CO., LTD., Taichung (TW)

( * ) Notice: Subject to any disclaimer, the term of this patent is extended or adjusted under 35 U.S.C. 154(b) by 0 days.

(21) Appl. No.: 14/819,442

(22) Filed: Aug. 6, 2015

(65) Prior Publication Data

US 2016/0039245 A1   Feb. 11, 2016

(30) Foreign Application Priority Data

Aug. 8, 2014   (TW) .............................. 103127281 A

(51) Int. Cl.
*B60B 1/02*   (2006.01)
*B60B 1/00*   (2006.01)
(Continued)

(52) U.S. Cl.
CPC ............ *B60B 1/0215* (2013.01); *B60B 1/003* (2013.01); *B60B 1/0223* (2013.01); *B60B 1/041* (2013.01);
(Continued)

(58) Field of Classification Search
CPC .. B60B 1/00; B60B 1/003; B60B 1/02; B60B 1/0215; B60B 1/04; B60B 1/041; B60B 1/042
(Continued)

(56) References Cited

U.S. PATENT DOCUMENTS 2,702,725 A * 2/1955 Lyman .................... B60B 1/003
                                                    301/59
3,907,372 A   9/1975 Goldberg
(Continued)

FOREIGN PATENT DOCUMENTS

EP   0786360 A2   7/1997
EP   0962338 A1   12/1999
(Continued)

OTHER PUBLICATIONS

A bike forum about bicycle wheel spokes found by the link http://www.bikeforums.net/bicycle-mechanics/209570-spoke-choice-though-sheldon.html published at Bike Forums Website: www.bikeforums.net on Jul. 9, 2006.
(Continued)

*Primary Examiner* — Jason R Bellinger
(74) *Attorney, Agent, or Firm* — CKC & Partners Co., Ltd.

(57) ABSTRACT

The bicycle wheel includes a rim, a hub, a driving device, a plurality of first side pulling spokes, a plurality of first side pushing spokes, and a plurality of second side spokes. The rim has a first side and a second side. The hub is located in a center of the rim. The driving device is connected to the hub which is located on the first side of the rim. Each of the first side pulling spokes and the first side pushing spokes is connected to the rim and the hub, and located on the first side of the rim, respectively. Each of the second side spokes is connected to the rim and the hub, and located on the second side of the rim.

16 Claims, 14 Drawing Sheets

(51) Int. Cl.
   *B60B 1/04*   (2006.01)
   *B60B 27/02*  (2006.01)
   *B60B 27/00*   (2006.01)
(52) U.S. Cl.
   CPC ............ *B60B 1/042* (2013.01); *B60B 27/023* (2013.01); *B60B 27/0015* (2013.01); *B60B 2900/111* (2013.01); *B60Y 2200/13* (2013.01); *Y02T 10/86* (2013.01)
(58) Field of Classification Search
   USPC ............................................. 301/55, 58–59
   See application file for complete search history.

(56) References Cited

U.S. PATENT DOCUMENTS

| | | | |
|---|---|---|---|
| 5,246,275 A | 9/1993 | Arredondo | |
| 5,494,337 A | 2/1996 | Behnke | |
| 5,882,088 A * | 3/1999 | Yahata | B60B 1/041 |
| | | | 301/110.5 |
| 6,024,414 A * | 2/2000 | Dietrich | B60B 1/0215 |
| | | | 301/110.5 |
| 6,145,938 A | 11/2000 | Dietrich | |
| 2002/0074853 A1 | 6/2002 | Krampera | |
| 2006/0255654 A1 | 11/2006 | Meggiolan | |
| 2007/0063574 A1 | 3/2007 | Mercat et al. | |

FOREIGN PATENT DOCUMENTS

| | | |
|---|---|---|
| EP | 1134096 A2 | 9/2001 |
| JP | 09202107 A | 8/1997 |
| TW | 533144 B | 5/2003 |

OTHER PUBLICATIONS

A website about bicycle wheel found by the link http://www.bontrager.com/model/12509 published at Bontrager Website: http://www.bontrager.com.

* cited by examiner

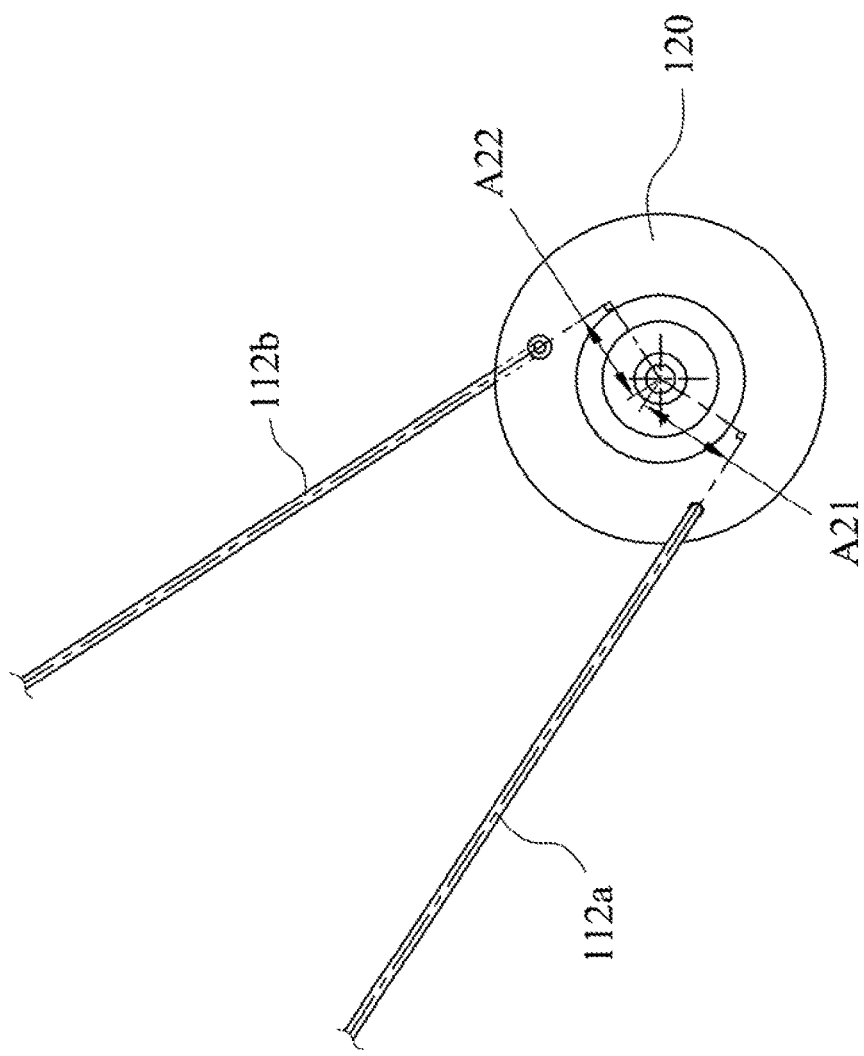

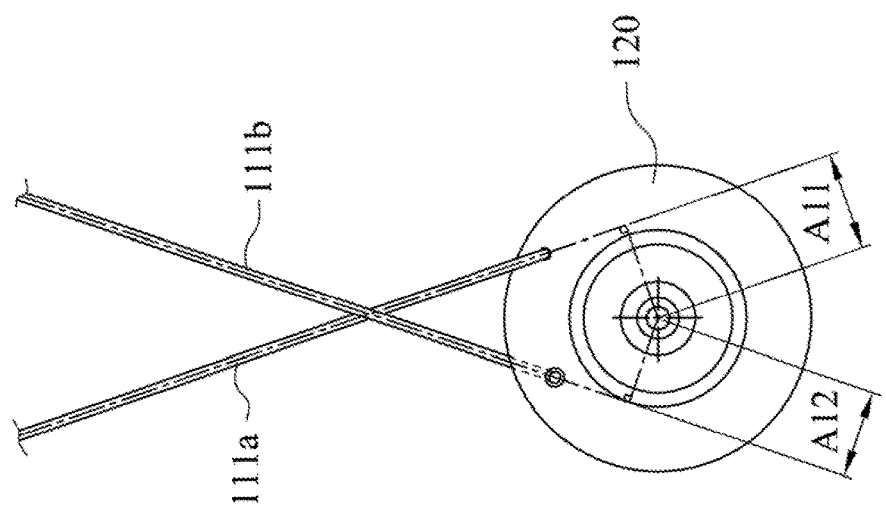

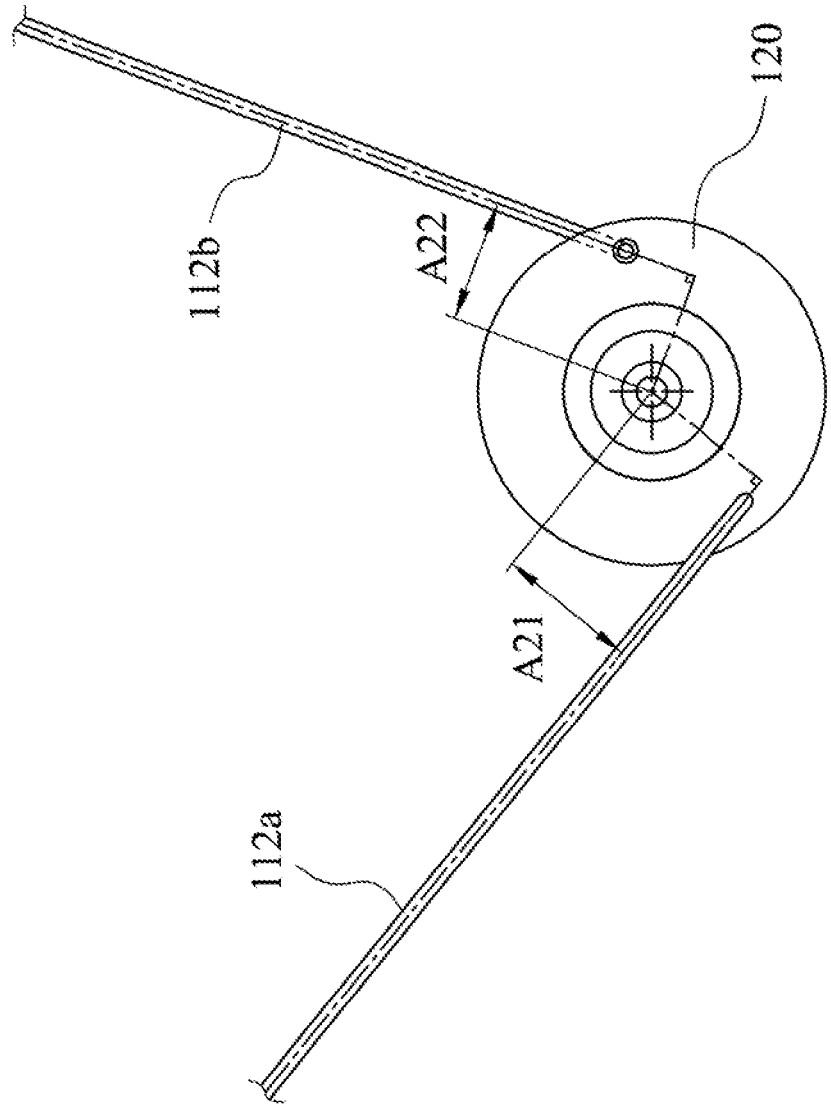

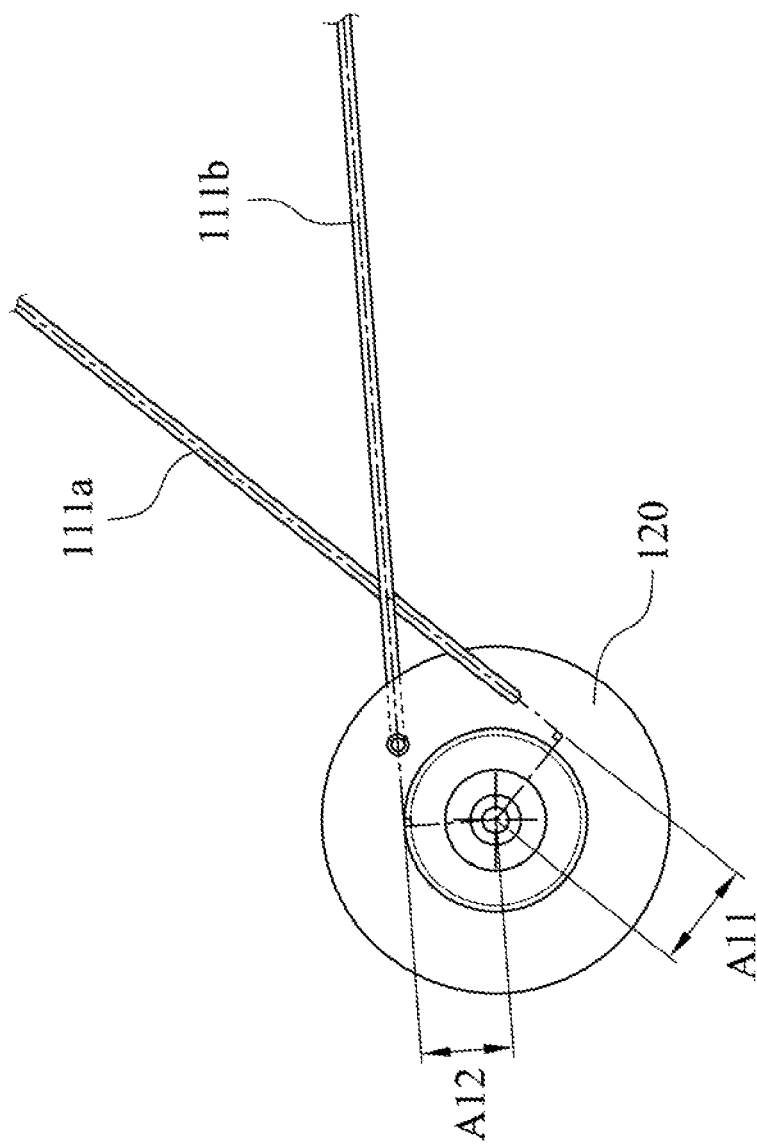

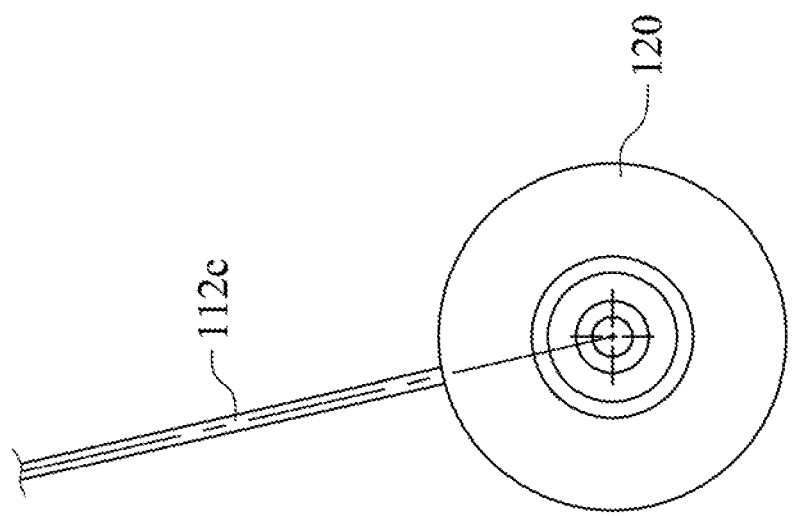

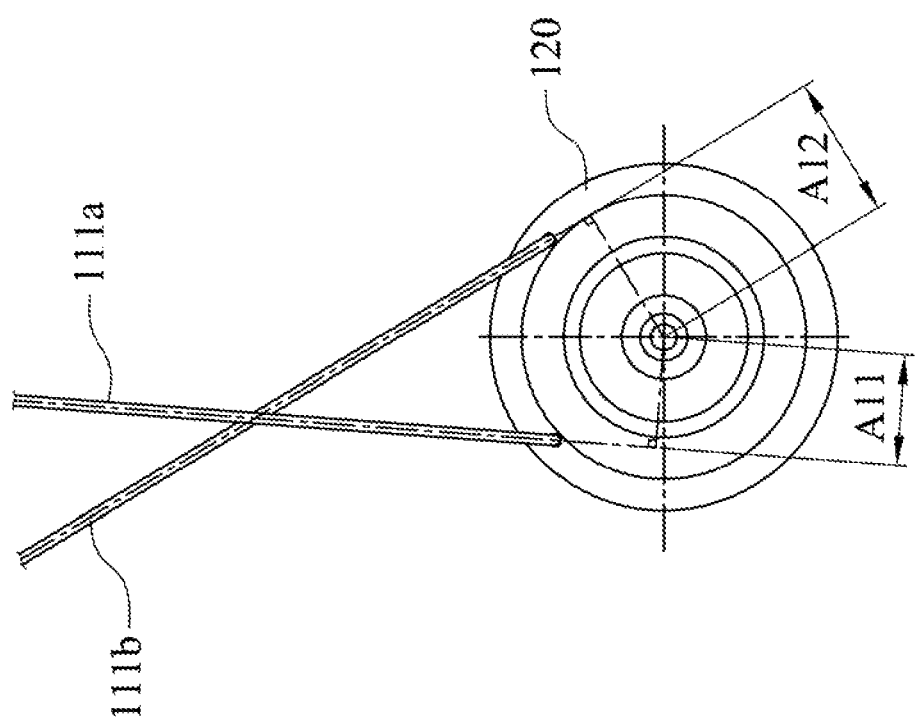

BICYCLE WHEEL

RELATED APPLICATIONS

This application claims priority to Taiwan Application Serial Number 103127281, filed Aug. 8, 2014, which is herein incorporated by reference.

BACKGROUND

Technical Field

The present disclosure relates to a wheel. More particularly, the present disclosure relates to a bicycle wheel.

Description of Related Art

Bicycle wheel can not only use to support the weight from user and the bicycle frame, but also bear the up-down-left-right impact stresses from various roads during cycling. Recently, the lightweight trend of bicycle leads to development of the lightweight design of bicycle wheel, especially the lightweight design of bicycle wheel with safety.

In general, conventional method for assembling bicycle wheel spokes structure is crossover weave method and radiation weave method. The spokes structure assembled by the radiation weave method provides worse power transmission. The spokes structure assembled by the cross weave method causes the increasing of the tension of pulling spokes and the decreasing of the tension of pushing spokes due to the power transmission. The aforementioned method for assembling bicycle wheel spokes structure will lead the pulling spoke broken easily when the tension of the pulling spoke is increased. Also, the pushing spokes will loosen easily when the tension thereof is decreased, so that the distribution of the stress of the bicycle wheel would be non-uniform and broken easily, and others spokes would be broken easily under the increasing tension.

SUMMARY

According to one aspect of the present disclosure, a bicycle wheel is provided. The bicycle wheel includes a rim, a hub, a driving device, a plurality of first side pulling spokes, a plurality of first side pushing spokes and a plurality of second side spokes. The rim has a first side and a second side. The hub is located in a center of the rim. The driving device is connected to the hub which is located on the first side of the rim. Each of the first side pulling spokes is connected to the rim and the hub, and located on the first side of the rim, wherein a vertical distance between an extending axis of each of the first side pulling spokes and a center of the hub is defined as a first arm $A11$. Each of the first side pushing spokes is connected to the rim and the hub, and located on the first side of the rim, wherein a vertical distance between an extending axis of each of the first side pushing spokes and the center of the hub is defined as a second arm $A12$. Each of the second side spokes is connected to the rim and the hub, and located on the second side of the rim. Wherein, $0<A11/A12$.

BRIEF DESCRIPTION OF THE DRAWINGS

The present disclosure can be more fully understood by reading the following detailed description of the embodiment, with reference made to the accompanying drawings as follows:

FIG. 6D is a partially enlarged view of the second side of the bicycle wheel of FIG. 6A;

FIG. 6E is a partially enlarged view of the first side 111 of the bicycle wheel of FIG. 6C;

FIG. 7D is a partially enlarged view of the second side of the bicycle wheel of FIG. 7A;

FIG. 7E is a partially enlarged view of the first side of the bicycle wheel of FIG. 7C;

FIG. 8D is a partially enlarged view of the second side of the bicycle wheel of FIG. 8A; and FIG. 8E is a partially enlarged view of the first side of the bicycle wheel of FIG. 8C.

DETAILED DESCRIPTION

Figure 1:
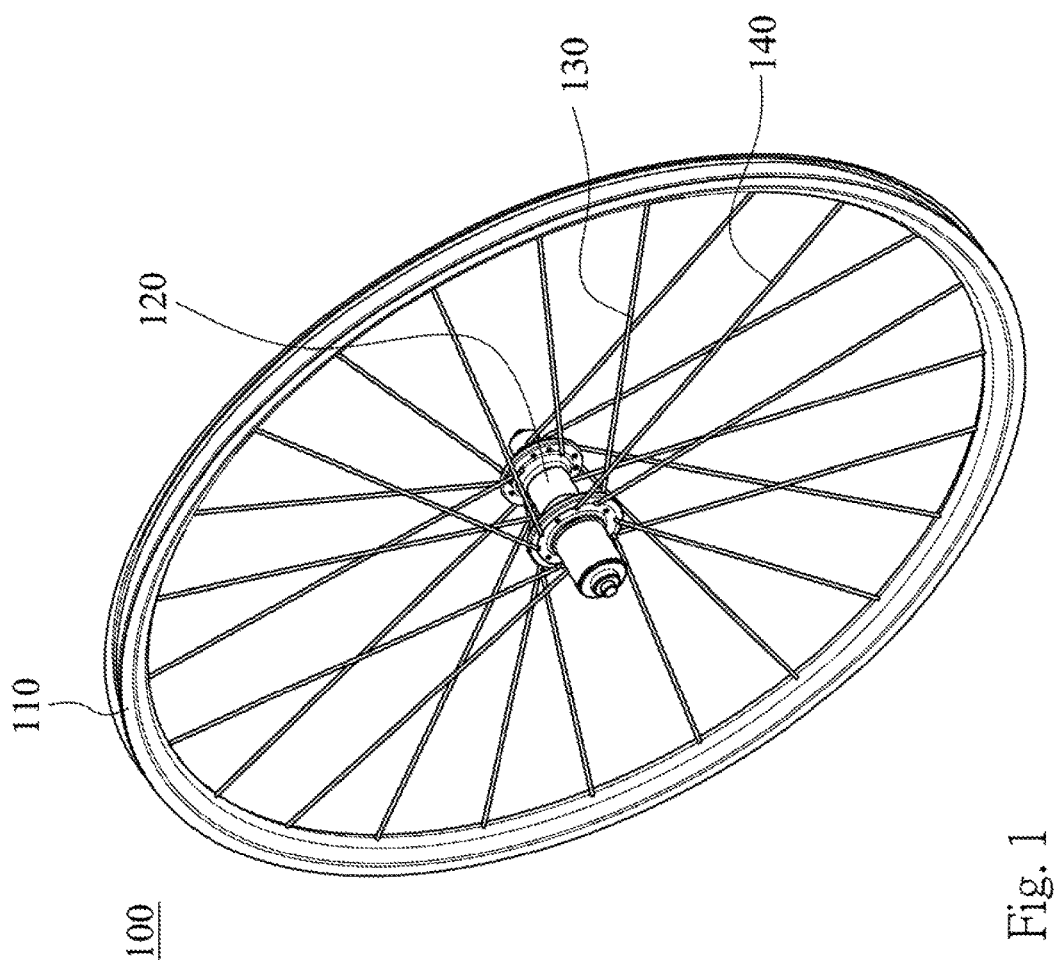
FIG. 1 is a three dimensional view of a bicycle wheel according to one embodiment of the present disclosure.

FIG. 1 is a three dimensional view of a bicycle wheel 100 according to one embodiment of the present disclosure. In FIG. 1, the bicycle wheel 100 includes a rim 110, a hub 120, a plurality of pulling spokes 130, and a plurality of pushing spokes 140. The hub 120 is located in a center of the rim 110.

The pulling spokes 130 of the present disclosure are defined as the spokes having a vector with a direction along an extending axis thereof from the hub 120 to the rim 110, and a direction of the moment on the center of the bicycle wheel generated from the vector is different from a rotation direction of the rim 110. The pushing spokes 140 of the present disclosure are defined as the spokes having a vector with a direction along an extending axis thereof from the hub 120 to the rim 110, and a direction of the moment on the center of the bicycle wheel generated from the vector is the same as the rotation direction of the rim 110.

Figure 2:
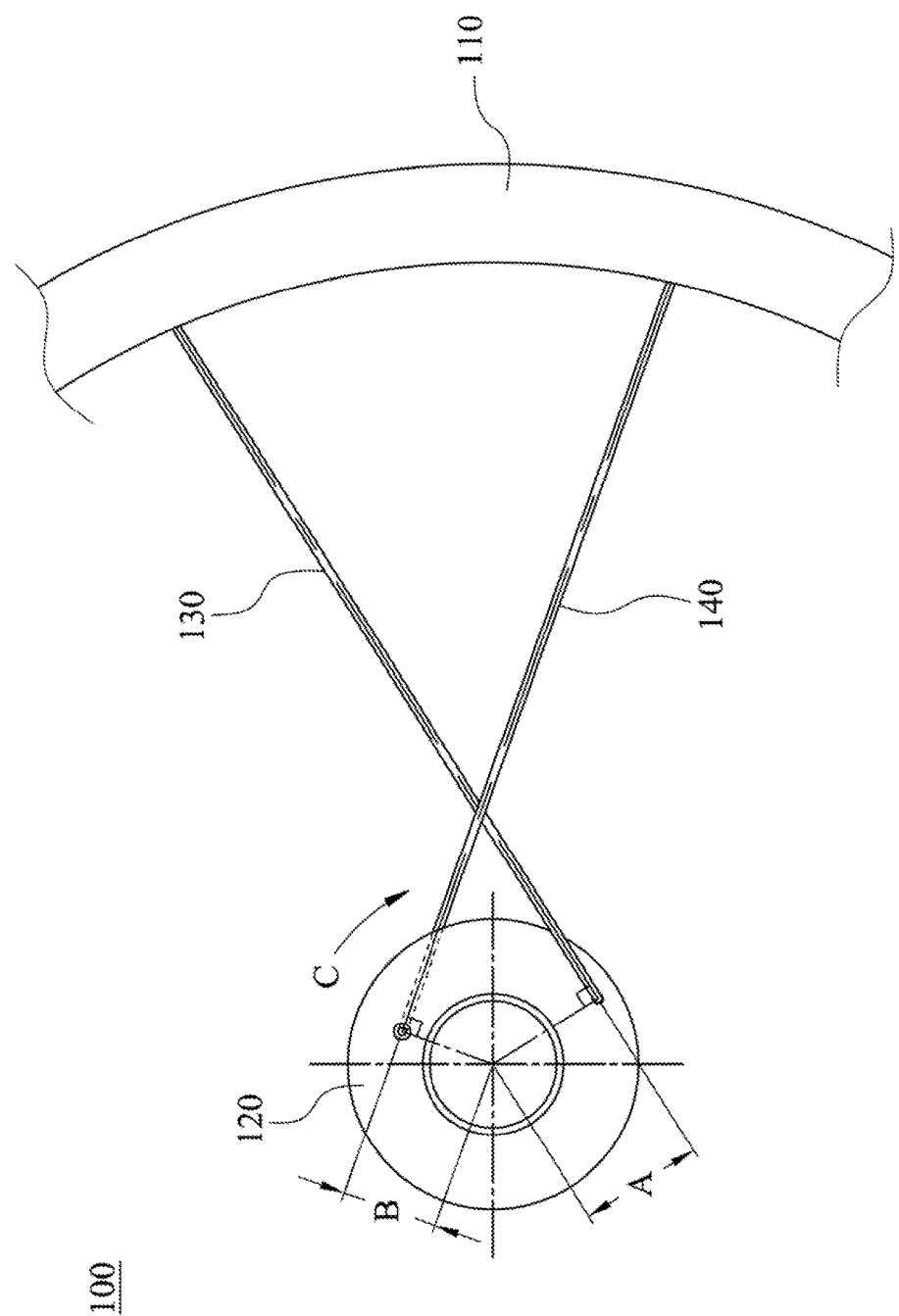
FIG. 2 is a partially enlarged view of the bicycle wheel according to the embodiment of FIG. 1.

FIG. 2 is a partially enlarged view of the bicycle wheel 100 of FIG. 1. Each of the pulling spokes 130 is connected to the rim 110 and the hub 120, wherein a vertical distance between an extending axis of each of the pulling spokes 130 and a center of the hub 120 is defined as a first arm A. Each of the pushing spokes 140 is connected to the rim 110 and the hub 120, wherein a vertical distance between an extending axis of each of the pushing spokes 140 and the center of the hub 120 is defined as a second arm B. Each of the second arms B is smaller than each of the first arms A. C presents as a rotation direction of the rim 110.

Further, a number of the pulling spokes 130 can be greater than or equal to a number of the pushing spokes 140.

Figure 3:
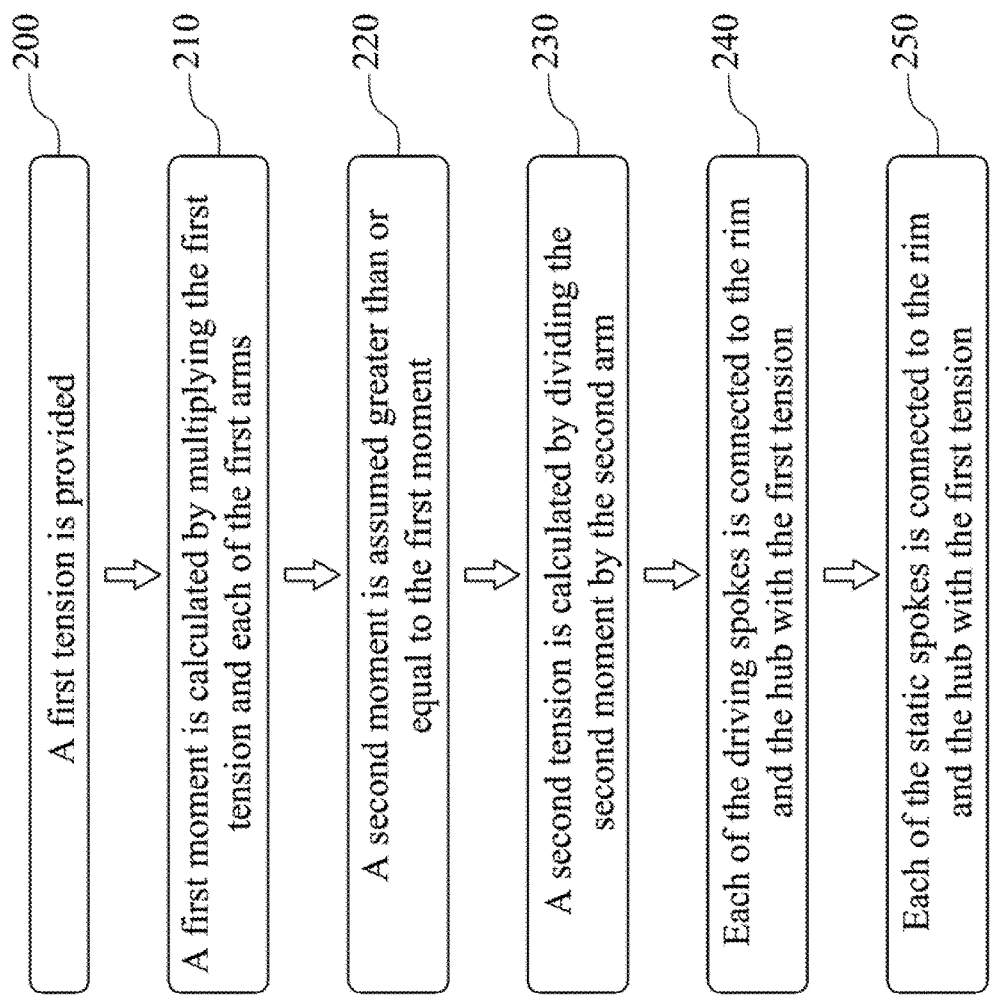
FIG. 3 is a flowchart of a method for assembling the bicycle wheel of FIG. 1.

FIG. 3 is a flowchart of a method for assembling the bicycle wheel 100 of FIG. 1, and the method for assembling the bicycle wheel 100 includes the following steps. Step 200, a first tension is provided. Step 210, a first moment is calculated by multiplying the first tension and each of the first arms A. Step 220, a second moment is assumed greater than or equal to the first moment. Step 230, a second tension is calculated by dividing the second moment by one of the second arms B. Step 240, each of the pulling spokes 130 is connected to the rim 110 and the hub 120 with the first tension. Step 250, each of the pushing spokes 140 is connected to the rim 110 and the hub 120 with the second tension.

In the embodiment of FIGS. 1-3, each of the second arms B is smaller than each of the first arms A, and the second moment is smaller than the first moment for calculating the first tension and the second tension. Using the first tension to connect the pulling spokes 130 to the rim 110 and the hub 120 can avoid the excessive tension during cycling, and using the second tension to connect the pushing spokes 140 to the rim 110 and the hub 120 can avoid the insufficient tension during cycling. Therefore, the bicycle wheel of the present disclosure not only can avoid a problem of non-uniform tension distribution, but also can increase durability.

Figure 4:
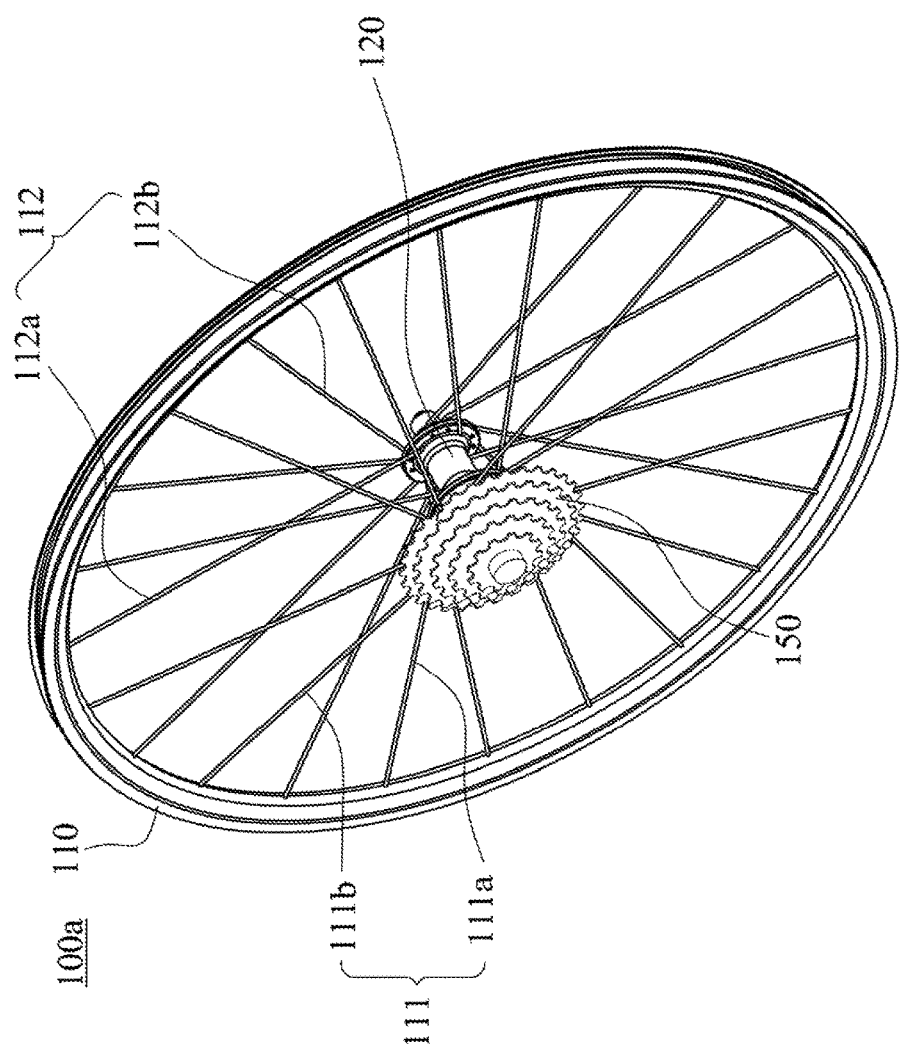
FIG. 4 is a three dimensional view of a bicycle wheel according to another embodiment of the present disclosure.

FIG. 4 is a three dimensional view of a bicycle wheel 100a according to another embodiment of the present disclosure. In FIG. 4, the bicycle wheel 100a is a bicycle rear wheel, and includes a rim 110, a hub 120, a driving device 150, a plurality of first side pulling spokes 111a, a plurality of first side pushing spokes 111b, and a plurality of second side spokes (not labeled) including a plurality of second side pulling spokes 112a and a plurality of second side pushing spokes 112b. The rim 110 has a first side 111 and a second side 112. The hub 120 is located in a center of the rim 110. The driving device 150 is connected to the hub 120 which is located on the first side 111 of the rim 110. Each of the first side pulling spokes 111a is connected to the rim 110 and the hub 120, and located on the first side 111 of the rim 110, wherein a vertical distance between an extending axis of each of the first side pulling spokes 111a and the center of the hub 120 is defined as a first arm A11 (shown in FIG. 6E). Each of the first side pushing spokes 111b is connected to the rim 110 and the hub 120, and located on the first side 111 of the rim 110, wherein a vertical distance between an extending axis of each of the first side pushing spokes 111b and the center of the hub 120 is defined as a second arm A12 (shown in FIG. 6E). Each of the second side pulling spokes 112a is connected to the rim 110 and the hub 120, and located on the second side 112 of the rim 110, wherein a vertical distance between an extending axis of each of the second side pulling spokes 112a and the center of the hub 120 is defined as a third arm A21 (shown in FIG. 6D). Each of the second side pushing spokes 112b is connected to the rim 110 and the hub 120, and located on the second side 112 of the rim 110, wherein a vertical distance between an extending axis of each of the second side pushing spokes 112b and the center of the hub 120 is defined as a fourth arm A22 (shown in FIG. 6D), and each fourth arm is smaller than each third arm. The first side pulling spokes 111a, the first side pushing spokes 111b, the second side pulling spokes 112a and the second side pushing spokes 112b are connected to the hub 120 and the rim 110 in a straight-pulled method.

In detail, the first arm A11 and the second arm A12 satisfy the following relationship: $0 < A11/A12$. Therefore, durability of the bicycle wheel 100a can be increased. Moreover, the first arm A11 and the second arm A12 can satisfy the following relationship: $1 < A11/A12 \leq 3$, $1 \leq A11/A12 \leq 1.4$, $1.15 \leq A11/A12 \leq 2$, $1.15 \leq A11/A12 \leq 1.4$ or $1.24 \leq A11/A12 \leq 1.35$.

The third arm A21 and the fourth arm A22 satisfy the following relationship: $A21/A22 \geq 1$.

A sum of each first arm A11 between each first side pulling spoke 111a and the center of the hub 120 is defined as $\Sigma A11$, and a sum of each first arm A12 between each first side pushing spoke 111b and the center of the hub 120 is defined as $\Sigma A12$, wherein $\Sigma A11 - \Sigma A12 > 10$ mm. Further, $\Sigma A11$ and $\Sigma A12$ can be satisfied as $\Sigma A11 - \Sigma A12 > 30$ mm. Moreover, a sum of each third arm A21 between each second side pulling spoke 112a and the center of the hub 120 is defined as $\Sigma A21$, a sum of each fourth arm A22 between each second side pushing spoke 112b and the center of the hub 120 is defined as $\Sigma A22$, wherein $(\Sigma A11 + \Sigma A21) - (\Sigma A12 + \Sigma A22) > 10$ mm. Further, $\Sigma A11$, $\Sigma A12$, $\Sigma A21$ and $\Sigma A22$ can be satisfied as $(\Sigma A11 + \Sigma A21) - (\Sigma A12 + \Sigma A22) > 30$ mm.

The first side pulling spokes can include one or more values of the first arms A11, that is, the first arms A11 of the first side pulling spokes are not limited to one value. Further, the second arms A12, the third arms A21 and the fourth arms A22 are also not limited to one value, respectively.

Figure 5:
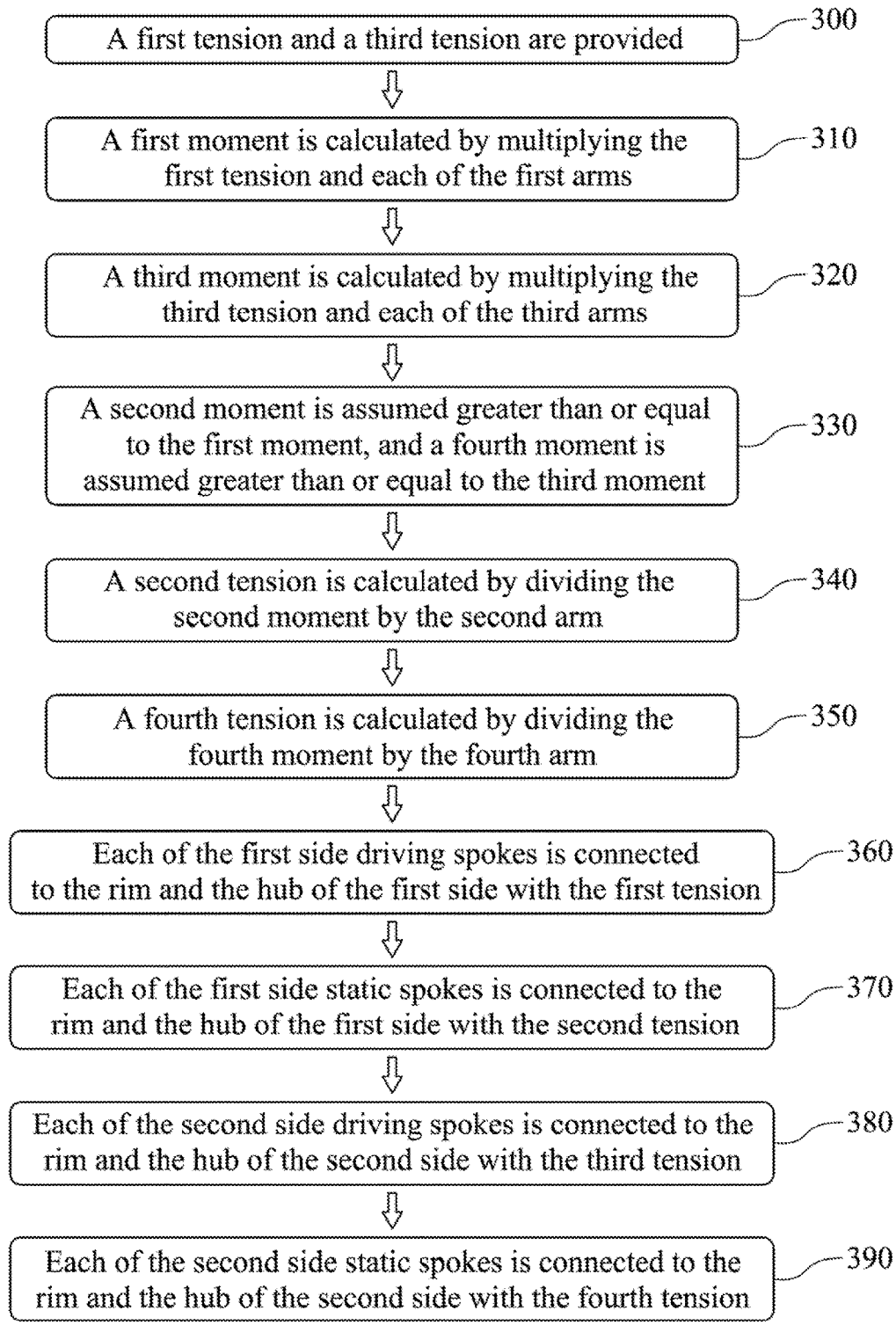
FIG. 5 is a flowchart of a method for assembling the bicycle wheel of FIG. 4.

FIG. 5 is a flowchart of a method for assembling the bicycle wheel 100a of FIG. 4, and the method includes the following steps. Step 300, a first tension and a third tension are provided. Step 310, a first moment is calculated by multiplying the first tension and each of the first arms A11. Step 320, a third moment is calculated by multiplying the third tension and each of the third arms A21. Step 330, a second moment is assumed greater than or equal to the first moment, and a fourth moment is assumed greater than or equal to the third moment. Step 340, a second tension is calculated by dividing the second moment by the second arm A12. Step 350, a fourth tension is calculated by dividing the fourth moment by the fourth arm A22. Step 360, each of the first side pulling spokes 111a is connected to the rim 110 and the hub 120 of the first side 111 with the first tension. Step 370, each of the first side pushing spokes 111b is connected to the rim 110 and the hub 120 of the first side 111 with the second tension. Step 380, each of the second side pulling spokes 112a is connected to the rim 110 and the hub 120 of the second side 112 with the third tension. Step 390, each of the second side pushing spokes 112b is connected to the rim 110 and the hub 120 of the second side 112 with the fourth tension.

In the embodiment of FIGS. 4 and 5, each of the second arms A12 is smaller than each of the first arms A11, each of the fourth arms A22 is smaller than each of the third arms A21, thus the sum of the second moment and the fourth moment is smaller than the sum of the first moment and the third moment, and the first tension, the second tension, the third tension and the fourth tension can be calculated. the first side pulling spokes 111a can be connected to the rim 110 and the hub 120 of the first side 111 by the first tension, the second side pulling spokes 112a can be connected to the rim 110 and the hub 120 of the second side 112 by the third tension, the first side pushing spokes 111b can be connected to the rim 110 and the hub 120 of the first side 111 by the second tension, and the second side pushing spokes 112b can be connected to the rim 110 and the hub 120 of the second side 112 by the fourth tension, so that the excessive tension between the rim 110 and the hub cab be avoided during cycling. Hence, the bicycle wheel and the method for assembling thereof in the present disclosure not only can avoid a problem of non-uniform tension distribution, but also can increase durability during using.

Each of the first side pulling spokes 111a has a first tension, and the first tension multiplied by the first arm A11 equals to a first moment, each of the first side pushing spokes 111b has a second tension, and the second tension multiplied by the second arm A12 equals to a second moment, each of the second side pulling spokes 112a has a third t tension, and the third tension multiplied by the third arm A21 equals to a third moment, and each of the second side pushing spokes has a fourth tension, and the fourth tension multiplied by the fourth arm A22 equals to a fourth moment. For satisfying the conditions that the second moment is smaller than the first moment and the fourth moment is smaller than the third moment, a number of the first side pulling spokes 111a can be greater than or equal to a number of the first side pushing spokes 111b and a number of the second side pulling spokes 112a can be greater than a number of the second side pushing spokes 112b, or a sum of the first side pulling spokes 111a and the first side pushing spokes 111b can be greater than or equal to a sum of the second side pulling spokes 112a and the second side pushing spokes 112b. The detail number of the first side pulling spokes 111a, the first side pushing spokes 111b, the second side pulling spokes 112a, and the second side pushing spokes 112b are shown in Table 1

TABLE 1

| Ratio of the spoke number of the first side and the spoke number of the second side | First side | | Second side | | |
|---|---|---|---|---|---|
| | Number of pulling spokes | Number of pushing spokes | Number of pulling spokes | Number of pushing spokes | Number of total spokes |
| 1:1 | 4 | 2 | 4 | 2 | 12 |
| | 4 | 2 | 2 | 4 | 12 |
| | 4 | 2 | 3 | 3 | 12 |
| | 5 | 4 | 5 | 4 | 18 |
| | 6 | 3 | 6 | 3 | 18 |
| | 6 | 4 | 5 | 5 | 20 |
| | 6 | 5 | 6 | 5 | 22 |
| | 7 | 4 | 7 | 4 | 22 |
| | 7 | 5 | 7 | 5 | 24 |
| | 7 | 5 | 6 | 6 | 24 |
| | 8 | 4 | 6 | 6 | 24 |
| | 8 | 4 | 8 | 4 | 24 |
| | 7 | 6 | 7 | 6 | 26 |
| | 8 | 5 | 8 | 5 | 26 |
| | 8 | 6 | 8 | 6 | 28 |
| | 8 | 6 | 7 | 7 | 28 |
| | 8 | 7 | 8 | 7 | 30 |
| | 10 | 5 | 10 | 5 | 30 |
| | 9 | 6 | 9 | 6 | 30 |
| | 10 | 6 | 10 | 6 | 32 |
| | 10 | 6 | 8 | 8 | 32 |
| | 10 | 7 | 10 | 7 | 34 |
| | 12 | 6 | 9 | 9 | 36 |
| | 12 | 6 | 12 | 6 | 36 |
| 2:1 | 6 | 6 | 3 | 3 | 18 |
| | 6 | 6 | 4 | 2 | 18 |
| | 8 | 4 | 3 | 3 | 18 |
| | 8 | 4 | 4 | 2 | 18 |
| | 12 | 6 | 6 | 3 | 27 |
| | 16 | 8 | 8 | 4 | 36 |
| 3:2 | 6 | 3 | 3 | 3 | 15 |
| | 8 | 4 | 4 | 4 | 20 |
| | 6 | 6 | 4 | 4 | 20 |

TABLE 1-continued

| Ratio of the spoke number of the first side and the spoke number of the second side | First side | | Second side | | |
|---|---|---|---|---|---|
| | Number of pulling spokes | Number of pushing spokes | Number of pulling spokes | Number of pushing spokes | Number of total spokes |
| | 10 | 5 | 5 | 5 | 25 |
| | 10 | 5 | 6 | 4 | 25 |
| | 9 | 9 | 6 | 6 | 30 |
| | 9 | 9 | 8 | 4 | 30 |
| | 10 | 8 | 6 | 6 | 30 |
| | 10 | 8 | 8 | 4 | 30 |
| | 12 | 6 | 6 | 6 | 30 |
| | 12 | 6 | 8 | 4 | 30 |
| | 14 | 7 | 8 | 6 | 35 |
| | 14 | 7 | 7 | 7 | 35 |
| | 18 | 9 | 12 | 6 | 45 |
| 4:3 | 8 | 8 | 6 | 6 | 28 |
| | 8 | 8 | 8 | 4 | 28 |
| | 10 | 6 | 6 | 6 | 28 |
| | 10 | 6 | 8 | 4 | 28 |
| | 16 | 8 | 10 | 6 | 40 |
| | 16 | 8 | 8 | 8 | 40 |
| 6:5 | 6 | 6 | 5 | 5 | 22 |
| | 6 | 6 | 6 | 4 | 22 |
| | 8 | 4 | 5 | 5 | 22 |
| | 8 | 4 | 6 | 4 | 22 |
| 5:3 | 5 | 5 | 3 | 3 | 16 |
| | 5 | 5 | 4 | 2 | 16 |
| | 6 | 4 | 3 | 3 | 16 |
| | 6 | 4 | 4 | 2 | 16 |
| | 9 | 6 | 6 | 3 | 24 |
| | 6 | 9 | 6 | 3 | 24 |
| | 12 | 8 | 6 | 6 | 32 |
| | 12 | 8 | 8 | 4 | 32 |
| | 15 | 10 | 9 | 6 | 40 |
| 5:4 | 6 | 4 | 4 | 4 | 18 |
| | 5 | 5 | 4 | 4 | 18 |
| | 9 | 6 | 6 | 6 | 27 |
| | 9 | 6 | 8 | 4 | 27 |
| | 12 | 8 | 10 | 6 | 36 |
| | 12 | 8 | 8 | 8 | 36 |
| 7:3 | 7 | 7 | 3 | 3 | 20 |
| | 7 | 7 | 4 | 2 | 20 |
| | 8 | 6 | 4 | 2 | 20 |
| | 8 | 6 | 3 | 3 | 20 |
| | 14 | 7 | 6 | 3 | 30 |
| 7:4 | 7 | 7 | 4 | 4 | 22 |
| | 8 | 6 | 4 | 4 | 22 |
| | 12 | 9 | 8 | 4 | 33 |
| | 12 | 9 | 6 | 6 | 33 |
| 7:5 | 7 | 7 | 5 | 5 | 24 |
| | 7 | 7 | 6 | 4 | 24 |
| | 8 | 6 | 5 | 5 | 24 |
| | 8 | 6 | 6 | 4 | 24 |
| 7:6 | 7 | 7 | 6 | 6 | 26 |
| | 8 | 6 | 6 | 6 | 26 |
| | 8 | 6 | 8 | 4 | 26 |
| 8:5 | 8 | 8 | 6 | 4 | 26 |
| | 8 | 8 | 5 | 5 | 26 |
| | 10 | 6 | 5 | 5 | 26 |
| | 10 | 6 | 6 | 4 | 26 |
| 8:7 | 4 | 4 | 4 | 3 | 15 |
| | 10 | 6 | 7 | 7 | 30 |
| | 8 | 8 | 7 | 7 | 30 |
| | 8 | 8 | 8 | 6 | 30 |

Figure 6C:
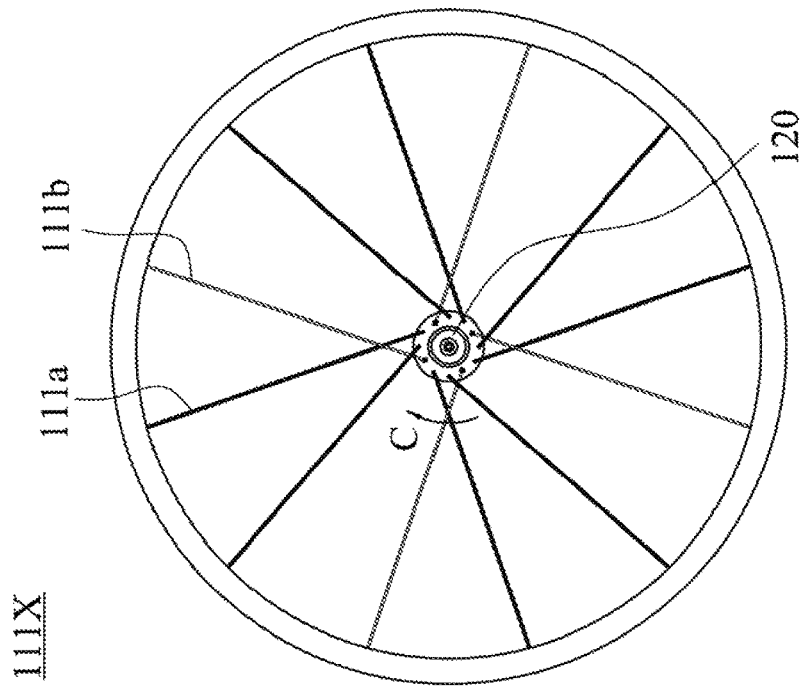
FIG. 6C is a right-side schematic view of the bicycle wheel of FIG. 6A.
Figure 6B:
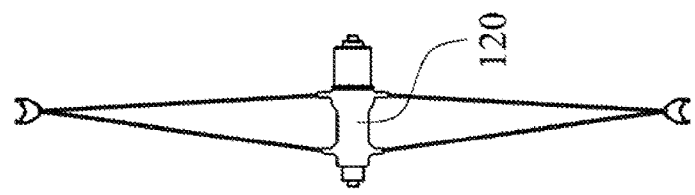
FIG. 6B is a front-side schematic view of the bicycle wheel of FIG. 6A.
Figure 6A:
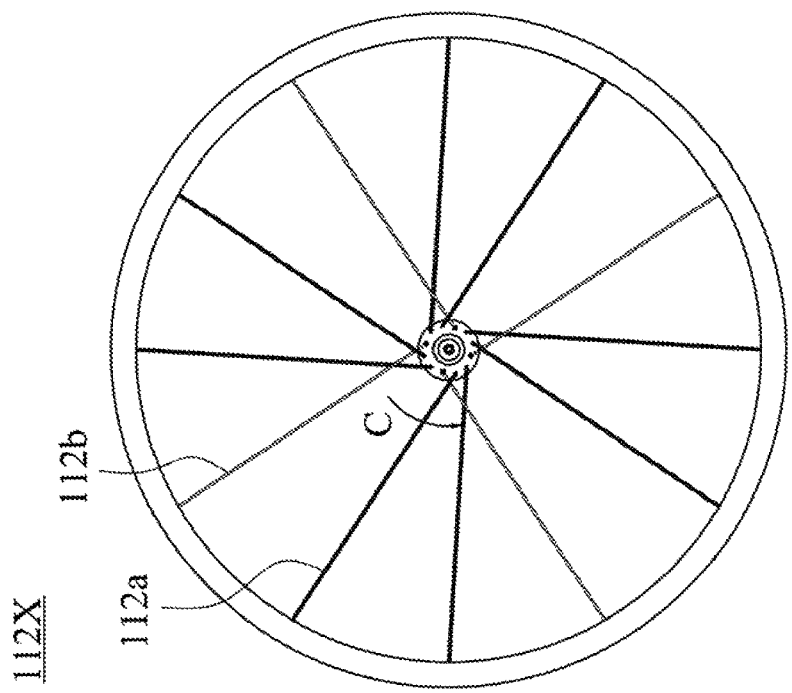
FIG. 6A is a left-side schematic view of a bicycle wheel according to further another embodiment of the present disclosure.

FIG. 6A is a left-side schematic view of a bicycle wheel according to further another embodiment of the present disclosure, FIG. 6B is a front-side schematic view of the bicycle wheel of FIG. 6A, and FIG. 6C is a right-side schematic view of the bicycle wheel of FIG. 6A.

In the embodiment of FIG. 6C, the right side is a first side 111X of a rim 110. A driving device 150 being a chain wheel is located on the first side 111X. A number of the first side pulling spokes 111a is 8, a number of the first side pushing spokes 111b is 4, and a sum of the first side pulling spokes 111a and the first side pushing spokes 111b is 12. C presents a rotation direction of the rim 110. FIG. 6A shows a second side 112X of a rim 110 as the left side. A number of the second side pulling spokes 112a is 8, a number of the second side pushing spokes 112b is 4, and a sum of the second side pulling spokes 112a and the second side pushing spokes 112b is 12. C presents a rotation direction of the rim 110. A ratio of the sum of the first side pulling spokes 111a and the first side pushing spokes 111b and the sum the second side pulling spokes 112a and the second side pushing spokes 112b (that is, the ratio of the spoke number of the first side 111X and the spoke number of the second side 112X) is 1:1. A sum of the first side pulling spokes 111a, the first side pushing spokes 111b, the second side pulling spokes 112a, and the second side pushing spokes 112b is 24.

FIG. 6D is a partially enlarged view of the second side 112X of the bicycle wheel of FIG. 6A. FIG. 6E is a partially enlarged view of the first side 111X of the bicycle wheel of FIG. 6C. In FIGS. 6D and 6E, the vertical distance between the extending axis of each of the first side pulling spokes 111a and the center of the hub 120 is the first arm A11, the vertical distance between the extending axis of each of the first side pushing spokes and the center of the hub 120 is the second arm A12, the vertical distance between the extending axis of each of the second side pulling spokes 112a and the center of the hub 120 is the third arm A21, the vertical distance between the extending axis of each of the second side pushing spokes 112b and the center of the hub 120 is the fourth arm A22. According to the embodiment of FIG. 6E, the values of the first arms A11 of the first side pulling spokes 111a are the same, that is, the first side pulling spokes 111a include only one value of the first arms A11. In detail, each of the first arms A11 is 21.18 mm, each of the second arms A12 is 21.18 mm, each of the third arm A21 is 17.58 mm, each of the fourth arm A22 is 17.58 mm, wherein A11/A12=1, A21/A22=1, ΣA11−ΣA12=84.72 mm, and (ΣA11+ΣA21)−(ΣA12+ΣA22)=155.04 mm.

Figure 7C:
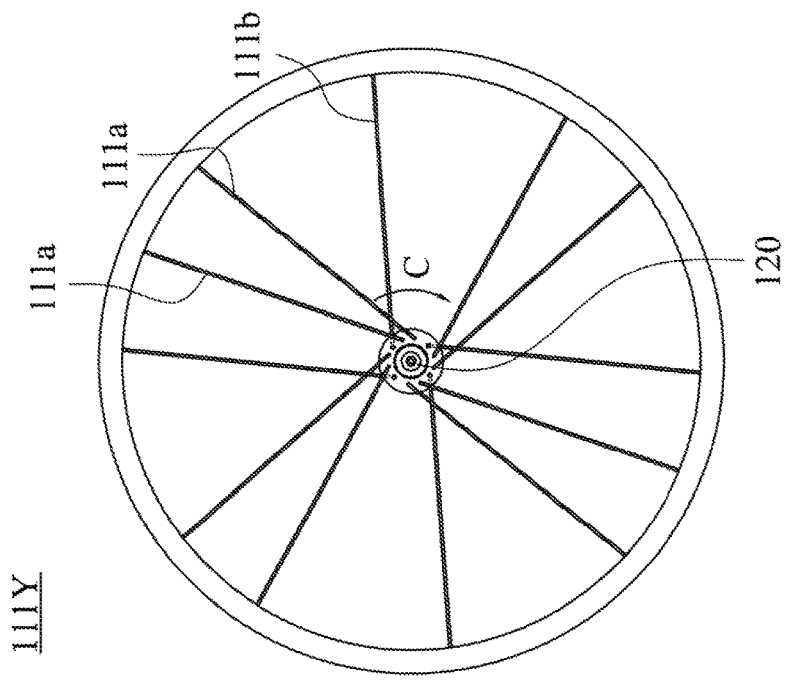
FIG. 7C is a right-side schematic view of the bicycle wheel of FIG. 7A.
Figure 7B:
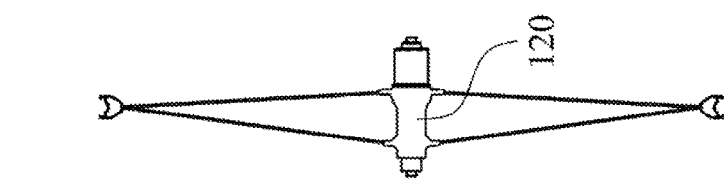
FIG. 7B is a front-side schematic view of the bicycle wheel of FIG. 7A.
Figure 7A:
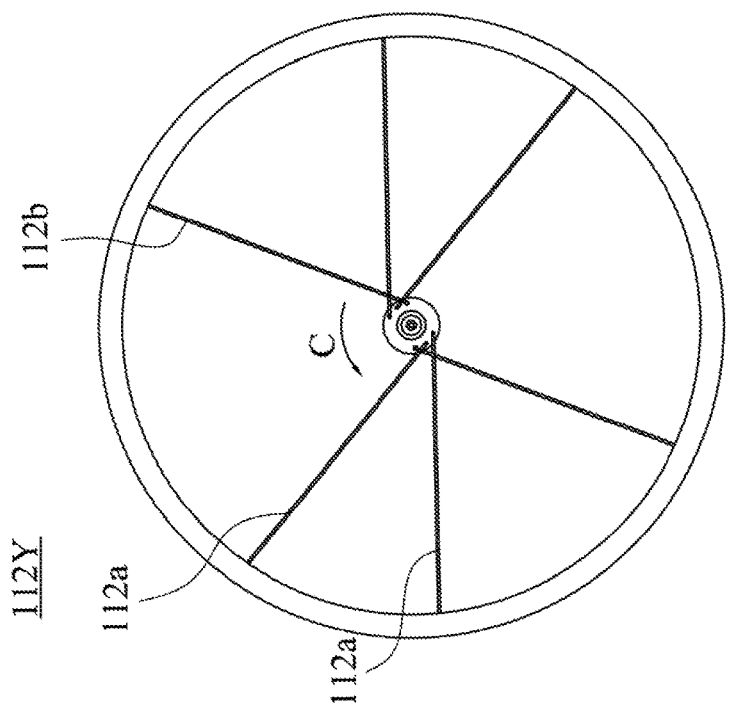
FIG. 7A is a left-side schematic view of a bicycle wheel according to still another embodiment of the present disclosure.

FIG. 7A is a left-side schematic view of a bicycle wheel according to still another embodiment of the present disclosure, FIG. 7B is a front-side schematic view of the bicycle wheel of FIG. 7A, and FIG. 7C is a right-side schematic view of the bicycle wheel of FIG. 7A.

According to the embodiment of FIG. 7C, the right side is a first side 111Y of a rim 110. A driving device 150 being a chain wheel is located on the first side 111Y. A number of the first side pulling spokes 111a is 8, a number of the first side pushing spokes 111b is 4, and a sum of the first side pulling spokes 111a and the first side pushing spokes 111b is 12. C presents a rotation direction of the rim 110. FIG. 7A shows a second side 112Y of a rim 110 as the left side. A number of the second side pulling spokes 112a is 4, a number of the second side pushing spokes 112b is 2, and a sum of the second side pulling spokes 112a and the second side pushing spokes 112b is 6. C presents a rotation direction of the rim 110. A ratio of the sum of the first side pulling spokes 111a and the first side pushing spokes 111b and the sum the second side pulling spokes 112a and the second side pushing spokes 112b (that is, the ratio of the spoke number of the first side 111Y and the spoke number of the second side 112Y) is 2:1. A sum of the first side pulling spokes 111a, the first side pushing spokes 111b, the second side pulling spokes 112a, and the second side pushing spokes 112b is 18.

FIG. 7D is a partially enlarged view of the second side 112Y of the bicycle wheel of FIG. 7A. FIG. 7E is a partially enlarged view of the first side 111Y of the bicycle wheel of FIG. 7C. In FIGS. 7D and 7E, the vertical distance between the extending axis of each of the first side pulling spokes 111a and the center of the hub 120 is the first arm A11, the vertical distance between the extending axis of each of the first side pushing spokes and the center of the hub 120 is the second arm A12, the vertical distance between the extending axis of each of the second side pulling spokes 112a and the center of the hub 120 is the third arm A21, the vertical distance between the extending axis of each of the second side pushing spokes 112b and the center of the hub 120 is the fourth arm A22. According to the embodiment of FIGS. 7D and 7E, the first arms A11 of the first side pulling spokes 111a include two different values, each two of the first side pulling spokes 111a which are adjacent to each other have different values of the first arms A11. The third arms A21 of the second side pulling spokes 112a include two different values, each two of the second side pulling spokes 112a which are adjacent to each other have different values of the third arms A21. In detail, each two of the first arms A11 which are adjacent to each other are 20.13 mm, 17.58 mm, respectively, each of the second arms A12 is 17.58 mm, each two of the third arms A21 which are adjacent to each other are 23.11 mm, 21.98 mm, respectively, each of the fourth arm A22 is 20.13 mm. When A11=20.13 mm, A11/A12=1.15; when A11=17.58 mm, A11/A12=1. When A21=23.11 mm, A21/A22=1.15; when A21=21.98 mm, A21/A22=1.09. ΣA11−ΣA12=80.52 mm, and (ΣA11+ΣA21)−(ΣA12+ΣA22)=44.74 mm.

Figure 8C:
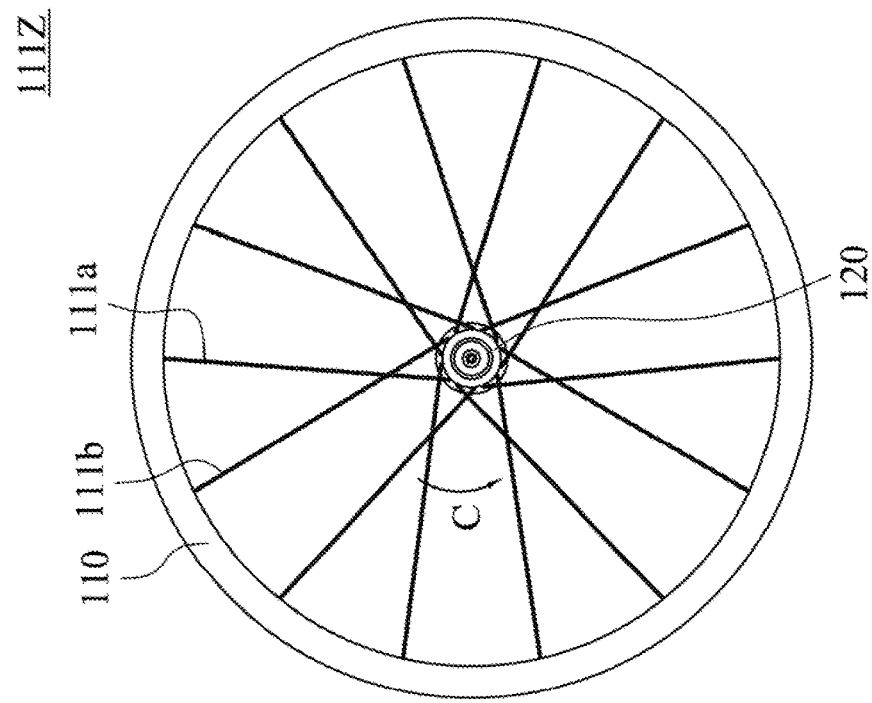
FIG. 8C is a right-side schematic view of the bicycle wheel of FIG. 8A.
Figure 8B:
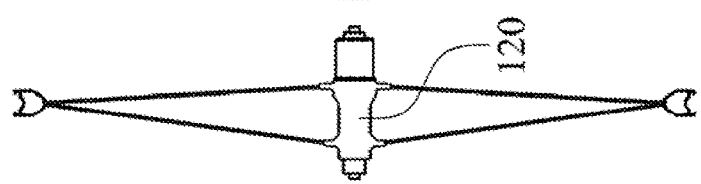
FIG. 8B is a front-side schematic view of the bicycle wheel of FIG. 8A.
Figure 8A:
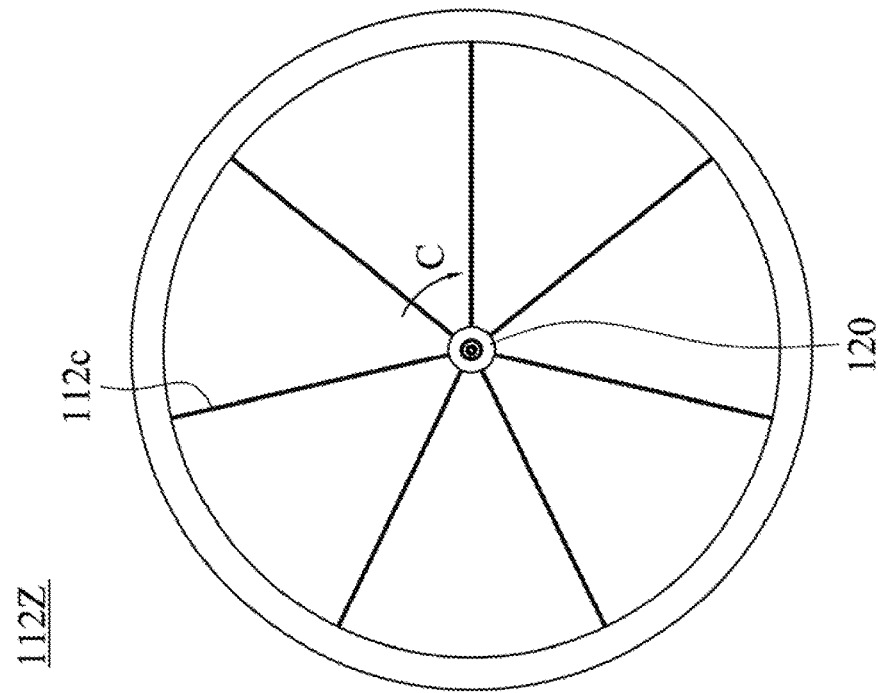
FIG. 8A is a left-side schematic view of a bicycle wheel according to still another embodiment of the present disclosure.

FIG. 8A is a left-side schematic view of a bicycle wheel according to still another embodiment of the present disclosure, FIG. 8B is a front-side schematic view of the bicycle wheel of FIG. 8A, and FIG. 8C is a right-side schematic view of the bicycle wheel of FIG. 8A.

In FIGS. 8A to 8C, the bicycle wheel is a rear bicycle wheel. In general, the rear bicycle wheel provides braking function, so that C presents a rotation direction of the rim 110 which is in the braked situation. The right side is a first side 111Z of a rim 110. A driving device 150 being a chain wheel is located on the first side 111Z, that is, the first side 111Z is a driving side. A number of the first side pulling spokes 111a is 7, a number of the first side pushing spokes 111b is 7, and a sum of the first side pulling spokes 111a and the first side pushing spokes 111b is 14. A number of the second side spokes 112c is 7.

FIG. 8D is a partially enlarged view of the second side 112Z of the bicycle wheel of FIG. 8A. FIG. 8E is a partially enlarged view of the first side 111Z of the bicycle wheel of FIG. 8C. In FIGS. 8D and 8E, the first arm A11 which represents a vertical distance between an extending axis of each of the first side pulling spokes 111a and the center of the hub 120 is 21 mm, the second arm A12 which represents a vertical distance between an extending axis of each of the first side pushing spokes 111b and the center of the hub 120 is 27 mm. That is, 0<A11/A12<1. Moreover, the arm which represents a vertical distance between an extending axis of each of the second side spokes 112c and the center of the hub 120 is 0.

Therefore, the bicycle wheel and the method for assembling thereof of the present disclosure provide the following advantages.

1. Each of the first arms is greater than each of the second arms, and each of the third arms is greater than each of the fourth arms. Hence, the tension of the pulling spokes (including the first side pulling spokes and the second side pulling spokes) is smaller than the tension of the conventional pulling spokes under the condition without forcing; and the tension of the pushing spokes (including the first side pushing spokes and the second side pushing spokes) is greater than the tension of the conventional pulling spokes under the condition without forcing. By such arrangement, break of the pulling spokes and the pushing spokes can be avoided.

2. The number of the first side pulling spokes is greater than the number of the first side pushing spokes, and the number of the second side pulling spokes is greater than the number of the second side pushing spokes, and the tension of the pulling spokes (including the first side pulling spokes and the second side pulling spokes) is smaller than the tension of the conventional pulling spokes under the condition without forcing; and the tension of the pushing spokes (including the first side pushing spokes and the second side pushing spokes) is greater than the tension of the conventional pulling spokes under the condition without forcing. Hence, the forcing tension of the pulling spokes is smaller than the conventional pulling spokes, and the forcing tension of the pushing spokes is greater than the conventional pulling spokes. By such arrangement, break of the pulling spokes and the pushing spokes can be avoided.

3. The bicycle wheel of the present disclosure can be applied to a bicycle as the bicycle front wheel or the bicycle rear, and when the arm of each said spokes satisfy the relationship, the bicycle wheel has better rigidity, so that the ruggedness and the safety of the bicycle wheel can be provided.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A bicycle wheel, comprising:
a rim, having a first side and a second side;
a hub located in a center of the rim;
a driving device connected to the hub which is located on the first side of the rim;
a plurality of first side pulling spokes, each of the first side pulling spokes connected to the rim and the hub, and located on the first side of the rim, wherein a vertical distance between an extending axis of each of the first side pulling spokes and a center of the hub is defined as a first arm (A11);
a plurality of first side pushing spokes, each of the first side pushing spokes connected to the rim and the hub, and located on the first side of the rim, wherein a vertical distance between an extending axis of each of the first side pushing spokes and the center of the hub is defined as a second arm (A12); and
a plurality of second side spokes, each of the second side spokes connected to the rim and the hub, and located on the second side of the rim;
wherein, $0<(A11/A12)$;
wherein a sum of each first arm between each first side pulling spoke and the center of the hub is defined as ($\Sigma A11$), and a sum of each first arm between each first side pushing spoke and the center of the hub is defined as ($\Sigma A12$);
wherein, ($\Sigma A11-\Sigma A12$)>30 mm;
wherein a number of the first side pulling spokes is greater than a number of the first side pushing spokes.

2. The bicycle wheel of claim 1, wherein the first side pulling spokes are defined as the spokes having a pulling vector with a direction along an extending axis thereof from the hub to the rim, a direction of the moment on the center of the bicycle wheel generated from the pulling vector is different from a rotation direction of the rim, the first side pushing spokes are defined as the spokes having a pushing vector with a direction along an extending axis thereof from the hub to the rim, and a direction of the moment on the center of the bicycle wheel generated from the pushing vector is the same as the rotation direction of the rim.

3. The bicycle wheel of claim 1, wherein the bicycle wheel is a bicycle rear wheel.

4. The bicycle wheel of claim 3, wherein, $1<(A11/A12)\leq3$.

5. The bicycle wheel of claim 4, wherein, $1.15\leq(A11/A12)\leq1.4$.

6. The bicycle wheel of claim 4, wherein the second side spokes comprise:
a plurality of second side pulling spokes, each of the second side pulling spokes connected to the rim and the hub, and located on the second side of the rim, wherein a vertical distance between an extending axis of each of the second side pulling spokes and the center of the hub is defined as a third arm (A21); and
a plurality of second side pushing spokes, each of the second side pushing spokes connected to the rim and the hub, and located on the second side of the rim, wherein a vertical distance between an extending axis of each of the second side pushing spokes and the center of the hub is defined as a fourth arm (A22);
wherein, a sum of each third arm (A21) between each second side pulling spoke and the center of the hub is defined as ($\Sigma A21$), and a sum of each fourth arm (A22) between each second side pushing spoke and the center of the hub is defined as ($\Sigma A22$);
wherein, ($\Sigma A11+\Sigma A21$)−($\Sigma A12+\Sigma A22$)>30 mm.

7. The bicycle wheel of claim 5, wherein, $1.15\leq(A11/A12)\leq2$.

8. The bicycle wheel of claim 7, wherein the second side spokes comprises:
a plurality of second side pulling spokes, each of the second side pulling spokes connected to the rim and the hub, and located on the second side of the rim; and
a plurality of second side pushing spokes, each of the second side pushing spokes connected to the rim and the hub, and located on the second side of the rim.

9. The bicycle wheel of claim 8, wherein a vertical distance between an extending axis of each of the second side pulling spokes and the center of the hub is defined as a third arm (A21), and a vertical distance between an extending axis of each of the second side pushing spokes and the center of the hub is defined as a fourth arm (A22);
wherein, $(A21/A22)>1$.

10. The bicycle wheel of claim 8, wherein,
a vertical distance between an extending axis of each of the second side pulling spokes and the center of the hub is defined as a third arm (A21), and a sum of each third arm (A21) between each second side pulling spoke and the center of the hub is defined as ($\Sigma A21$); and
a vertical distance between an extending axis of each of the second side pushing spokes and the center of the hub is defined as a fourth arm (A22), a sum of each fourth arm (A22) between each second side pushing spoke and the center of the hub is defined as ($\Sigma A22$);
wherein, ($\Sigma A11+\Sigma A21$)−($\Sigma A12+\Sigma A22$)>30 mm.

11. The bicycle wheel of claim 5, wherein, $1.24\leq(A11/A12)\leq1.35$.

12. The bicycle wheel of claim 11, wherein the second side spokes comprises:
a plurality of second side pulling spokes, each of the second side pulling spokes connected to the rim and the hub, and located on the second side of the rim, wherein a vertical distance between an extending axis of each of the second side pulling spokes and the center of the hub is defined as a third arm (A21); and a plurality of second side pushing spokes, each of the second side pushing spokes connected to the rim and the hub, and located on the second side of the rim, wherein a vertical distance between an extending axis of each of the second side pushing spokes and the center of the hub is defined as a fourth arm (A22);

wherein, a sum of each first arm (A11) between each first side pulling spoke and the center of the hub is defined as (ΣA11), a sum of each first arm (A12) between each first side pushing spoke and the center of the hub is defined as (ΣA12), a sum of each third arm (A21) between each second side pulling spoke and the center of the hub is defined as (ΣA21), and a sum of each fourth arm (A22) between each second side pushing spoke and the center of the hub is defined as (ΣA22); wherein, (ΣA11+ΣA21)−(ΣA12+ΣA22)>10 mm.

13. The bicycle wheel of claim 11, wherein the first side pulling spokes, the first side pushing spokes and the second side spokes are connected to the hub and the rim in a straight-pulled method.

14. The bicycle wheel of claim 3, wherein, 1≤(A11/A12) ≤1.4.

15. The bicycle wheel of claim 2, wherein the bicycle wheel is a bicycle front wheel.

16. The bicycle wheel of claim 15, wherein, 0<(A11/A12) <1.

* * * * *